March 5, 1940.  H. C. STARKEY  2,192,563
FISHING LURE
Filed Feb. 27, 1939
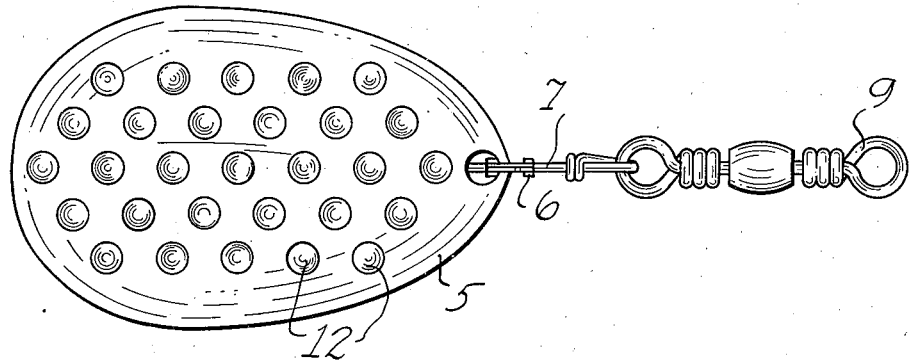
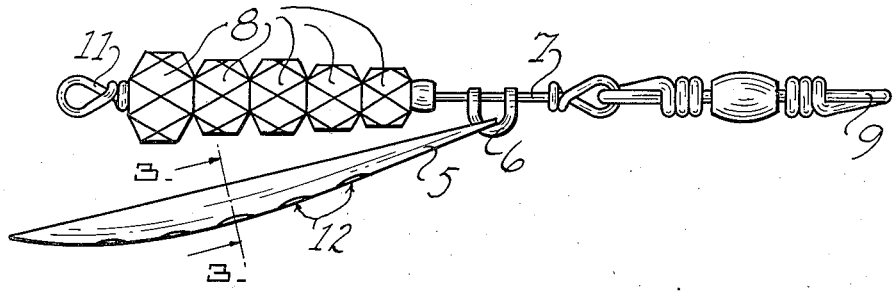
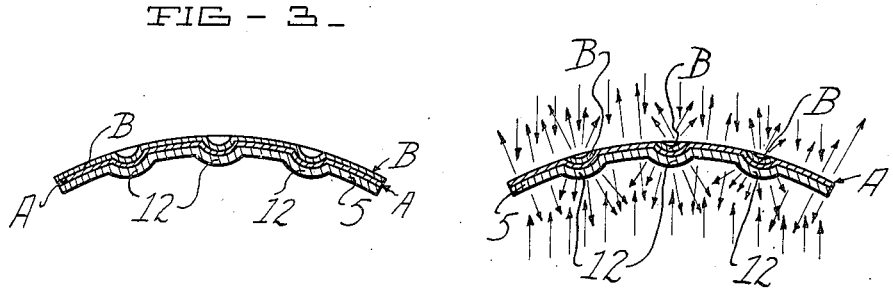
INVENTOR.
H. C. STARKEY.
BY Victor J Evans & Co
ATTORNEYS.

Patented Mar. 5, 1940

2,192,563

UNITED STATES PATENT OFFICE 2,192,563

FISHING LURE

Harold C. Starkey, Arcata, Calif.

Application February 27, 1939, Serial No. 258,823

1 Claim. (Cl. 43—45)

This invention relates to improvements in fishing lures and has particular reference to a spinner of the type which will attract fish through its reflective brilliance.

A further object of the invention is to produce a device of this character which is economical to manufacture, and one which will permit use in the standard manner.

Other objects and advantages will be apparent during the course of the following description.

In the accompanying drawing forming a part of this specification and in which like numerals are employed to designate like parts throughout the same:

Fig. 1 is a plan view of the face of my spinner;

Fig. 2 is a side elevation of Fig. 1;

Fig. 3 is a cross sectional view taken on the line 3—3 of Fig. 2; and

Fig. 4 is a similar cross sectional view after polishing.

Fish are attracted to objects which glisten, such as a shiny spoon. These spoons are commonly employed in fishing and usually consist of a plate which is polished to give a reflection.

I employ this type of spoon, multiplying the angles of reflection, and I accomplish this as will be noted in the drawing, wherein the numeral 5 designates a plate which is connected by a slider 6 to the stem 7 upon which colored beads 8 are rotatably held. This device is fastened into the line leader, as at 9, while the hook is secured, as at 11. The plate 5 has the customary outline and is formed with depressions 12 of any desired number. I now electroplate the plate or spoon 5 first with copper, as shown at A in Fig. 3, and then with a bright silver plating, as shown at B. I now polish off the silver plating so as to leave only the copper plating over the major area of the spoon and the silver plating only in the depressions. This is illustrated in Fig. 4, and by viewing this figure it will be noted that these depressions will form miniature reflectors which will greatly increase the visibility of the spoon because of the fact that the rays of light are bent in almost every direction, as indicated by the arrows. Therefore, a fish can hardly approach the spoon without catching the glint of the reflection therefrom.

While I have mentioned in the specification that I first copper plate then silver plate the metal, I wish to point out that a copper plate is preferably used only when I copper plate nickel silver. I then form my impressions then buff off the surface leaving a combination of copper indented spots with a silver-nickel base. In practice, most of the lures are made from brass, bronze and copper which are either chrome, nickel or silver plated to produce the bright spots and many combinations may be used. The main feature is to produce a spot of contrasting color to the base or major portion of the lure.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

The method of forming a spoon lure comprising the shaping of a blank into which depressions are sunk, said blank being plated with copper, thence plated with silver, said silver being polished away so as to leave only the depressions coated with silver, whereby said depressions will reflect light with a greater intensity than the remainder of the blank.

HAROLD C. STARKEY.